Nov. 8, 1927.                                          1,648,626
F. E. SMITH
ROLLER FOR BELT CONVEYERS AND METHOD OF MAKING THE SAME
Filed Feb. 11, 1925
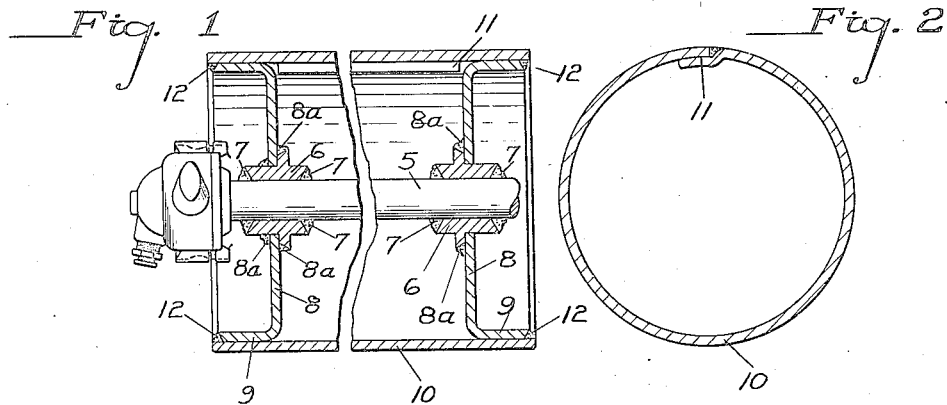
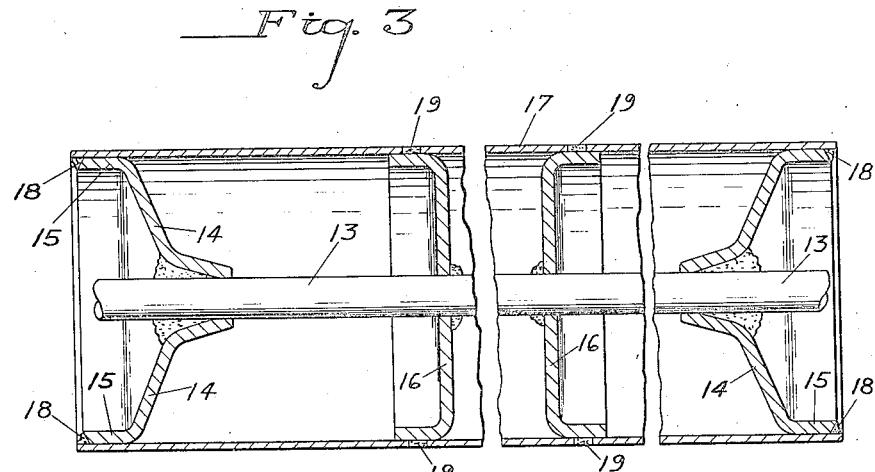
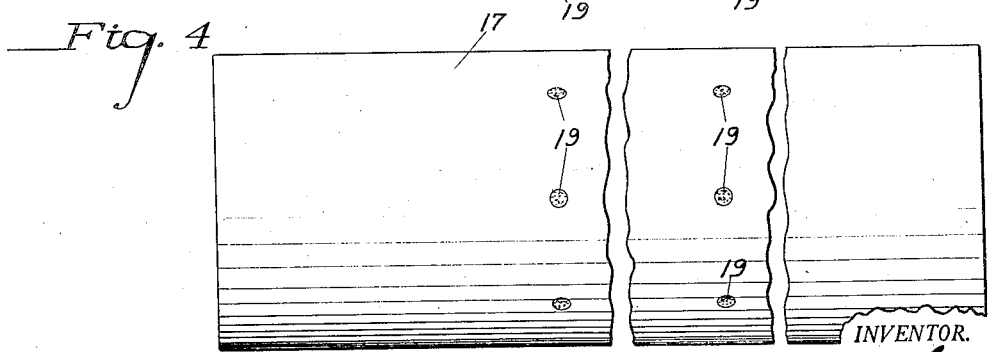
INVENTOR.
F. E. Smith
BY
D. Anthony Usina
ATTORNEY.

Patented Nov. 8, 1927.

1,648,626

UNITED STATES PATENT OFFICE.

FRANK E. SMITH, OF SCOTTDALE, PENNSYLVANIA.

ROLLER FOR BELT CONVEYERS AND METHOD OF MAKING THE SAME.

Application filed February 11, 1925. Serial No. 8,595.

This invention is for a roller and a method of making the same, and relates particularly to rollers of the type used for supporting belt conveyers.

The invention has for its object to provide a roll of cheap but durable construction, and a method of making the same.

The invention may be readily understood by reference to the accompanying drawings, in which:

Fig. 1 represents a longitudinal section through a roll constructed in accordance with my invention;

Fig. 2 is a transverse section through the shell of the roll;

Fig. 3 is a view generally similar to Fig. 1, of a slight modification;

Fig. 4 is a plan view of the roller of Fig. 3.

In the drawings, 5 designates the central shaft of the roller, 6 are hubs welded to the shaft, as indicated at 7, and welded to each hub is a disk 8 having a peripheral flange 9. The disks are welded to their respective hubs at the points designated 8ª.

After the parts heretofore described are assembled, the shaft may, if necessary, be mounted in a lathe and the flanges 9 are turned down to be truly concentric to the shaft.

The shell 10 of the roller is provided from a single sheet of metal which is rolled about the hub and disk assembly, and a lap weld formed at 11. This lap weld extends throughout the distance between disks 8, but terminates adjacent the disks. This permits the shell to fit about the disks, provides a strong seam, and tends to prevent endwise movement of the shell on the disks.

After the shell has been formed about the disks, it may be welded thereto as indicated at 12.

In the construction shown in Figs. 3 and 4, 13 is the shaft. Secured directly thereto, without hubs, and by welding, are end disks 14 having flanges 15. Intermediate disks 16, which are also flanged, may be provided.

After the desired disks have been secured to the shaft by welding, the shaft is placed in a lathe and the flanges of the several disks turned down. A section of seamless tubing is then slipped over the structure, to provide the shell 17 of the roller. When the shell has been put in place, it is welded to the end disks, at 18. If supporting disks 16 are used, the shell may be perforated over the flanges of these disks, and metal flowed into the holes, as indicated at 19.

In this fashion, a strong and durable roll may be built up. Various changes and modifications, however, may be made in the construction within the contemplation of the invention and under the scope of the appended claims.

I claim as my invention:

1. A roll structure comprising a shaft, a pair of oppositely directed end disks mounted thereon and having flanged peripheries, said disks being spaced inwardly from the ends of said shaft and having integral cone shaped hub portions cooperating with said shaft to form pockets for receiving welding metal for holding said disks on said shaft, intermediate disks having flanged peripheries on said shaft, said end disks having the edges of their flanged peripheries undercut, and a shell mounted around said flanged peripheries of said disks and projecting beyond the flanges of said first named disks and co-operating therewith to form a receiving pocket and retaining shelf for the deposit of welding metal for holding said shell on said first named disks, and means for securing said shell to said intermediate disks.

2. The method of making conveyer rollers which consists in mounting a plurality of disks having flanged peripheries on a shaft, securing said disks in place on said shaft by added deposits of welding metal, turning down the disks to make their flanges concentric to the shaft, mounting a shell over said disks so that it projects beyond the end disks, securing said shell to said end disks by depositing welding metal on the extended portions of said shell and on the flanges of the end disks, and flowing metal through perforations in the shell onto the flanges of the other disks to unite the shell and said other disks.

3. A roll structure comprising a shaft, a pair of oppositely directed end disks mounted thereon and having flanged peripheries, said disks being spaced inwardly from the ends of said shaft and having hub portions snugly engaging said shaft for a portion of their length and having their bore enlarged for the remainder of their length and said enlarged bore being adapted to co-operate with said shaft to form pockets for receiving deposits of welding metal for holding said disks on said shaft, said flanged peripheries of said disks having their edges undercut, and a shell mounted around said flanged peripheries of said disks and projecting beyond the flanges of said disks, the projecting portions of said shell cooperating with the undercut edges of said disks to form a receiving pocket and retaining shelf at each end of the shell for receiving and retaining a deposit of welding metal for holding said shell on said disks.

In testimony whereof I have hereunto signed my name.

FRANK E. SMITH.